Nov. 9, 1971 H. TYZAK 3,618,404

TUNING MECHANISM

Filed July 6, 1970 2 Sheets-Sheet 1

Inventor
HAROLD TYZACK
BY Mueller, Aichele & Rauner
ATTYS.

Inventor
HAROLD TYZACK
BY
Mueller, Aichele & Rauner
ATTYS

United States Patent Office 3,618,404 Patented Nov. 9, 1971

3,618,404 TUNING MECHANISM

Harold Tyzack, Schiller Park, Ill., assignor to Motorola, Inc., Franklin Park, Ill.

Continuation of application Ser. No. 821,580, May 5, 1969. This application July 6, 1970, Ser. No. 56,138
Int. Cl. F16h 35/18
U.S. Cl. 74—10.37 16 Claims

ABSTRACT OF THE DISCLOSURE

The push-button mechanism for operating the tuner of an AM/FM radio receiver includes five push-buttons for selecting ten stations, five AM stations and five FM stations. An axially moveable tuner control shaft has ten wire springs, two for each push-button, wound thereabout, with the ends extending in opposite directions on the same side of the shaft. When a push-button is depressed, a vertical shaft positioning tab engages one or both of the extensions of one of the two springs associated with the push-button in a direction to cause the spring to more tightly grip the shaft, thereby rotating the shaft and the spring together to select the station indicated by the vertical position of the spring on the shaft.

When the shaft is rotated to a position corresponding to a station to be subsequently selected by a particular push-button, the push-button may be pulled out; and memory reset tabs on the push-button slide engage one or both of the spring extensions in a direction to cause the spring to be released from the shaft to rotate the spring to a vertical position without rotating the shaft. Return of the push-button slide mechanism to a center position then permits the spring to tightly grip the shaft in this new position.

This application is a continuation of application Ser. No. 821,580 filed May 5, 1969, abandoned.

BACKGROUND OF THE INVENTION

With the modern trend to a reduction in the size of electronic components, the size of devices incorporating these components diminishes accordingly to the point that it has become desirable to reduce the size of the mechanical components of such devices in order to make full use of the space-saving resulting from the reduced size of the electronic components. This is especially true in automobile radios and the tuning mechanisms for these radios. As a consequence, it has become desirable to reduce the size of the push-button tuning mechanism for automobile radio receivers.

In addition, the push-button mechanism normally associated with such radios is a relatively complex and expensive mechanical device. Thus, it is desirable also to reduce the complexity of such a push-button mechanism in order to effect a corresponding reduction in the cost of the radio receiver.

SUMMARY OF THE INVENTION

Accordingly it is an object of this invention to reduce the size of and to simplify the push-button mechanism of a radio receiver.

It is another object of this invention to position a rotary shaft with a resettable position memory device normally gripping the shaft for rotation therewith but being releasable from the shaft for independent rotation to reset the memory device.

It is a further object of this invention to utilize a plurality of springs wrapped about a shaft as memory devices for positioning the shaft in accordance with engagement of extensions on the springs by a slide member moving in one direction, with resetting of the positions of the spring members on the shaft being accomplished by engaging the extensions with the slide member moving in the opposite direction.

In accordance with a preferred embodiment of this invention, a rotary shaft to be positioned has a resttable position memory means normally gripping the shaft for rotation therewith and having an engageable extension thereon. A first engaging means for engaging and moving the extension in a first direction causes the memory means to grip the shaft and to rotate the shaft in an amount determined by the distance the extension is moved and a second engaging means is provided for moving the extension in a second direction which causes release of the memory means from the shaft and permits the memory means to be rotated independently of the shaft in an amount determined by the distance the extension is moved in the second direction. The first and second engaging means are normally disengaged from the extension to permit rotation of the memory means with rotation of the shaft.

DETAILED DESCRIPTION

Figure 1:
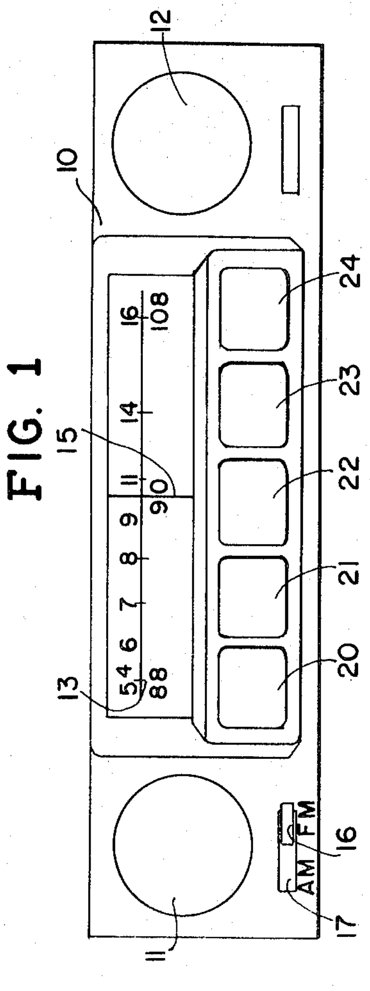
FIG. 1 is an illustration of the face plate of a push-button radio receiver with which a preferred embodiment of this invention may be utilized.

Referring now to the drawings, wherein like reference numbers are used throughout the several figures to denote the same or similar elements, there is shown in FIG. 1 a front view of a face plate 10 of an AM/FM push-button radio receiver. Mounted on the face plate 10 of the receiver are a pair of control knobs 11 and 12 for controlling the volume and manual tuning of the receiver in a conventional manner. In addition, a dial scale 13 with a station position indicating bar 15 is provided, so that the operator of the radio may have a visual indication of the particular station to which the receiver is tuned. The dial scale 13 has scales for both the AM and FM bands, and the receiver may be switched to the proper band by movement of an AM/FM switch lever 16 to either of two positions corresponding to the two bands to which the receiver may be tuned. As shown in FIG. 1, the switch lever 16 is in the rightmost of the two positions, indicating that the receiver is in its FM mode of operation, whereas movement of the lever 16 in the slot 17 to the left hand position will switch the receiver to its AM mode of operation. This mode of switching in the receiver may be effected in any suitable manner.

In addition to the manual tuning knob 12, there are provided five push-buttons 20 to 24 for tuning the receiver to ten preselected stations (five for each mode) in accordance with the setting of one of a pair of memory elements associated with each of the push-buttons 20 to 24. The manner of operating the push-buttons 20 to 24 is the same as that conventionally employed in push-button radios, where depressing the button causes the preset station to be selected by the tuner and pulling the button out to an extended position causes a memory element to be set in accordance with a station which has been tuned under control of the manual tuning knob, so that subsequent depression of the push-button causes the same station thereafter to be selected.

Figure 2:
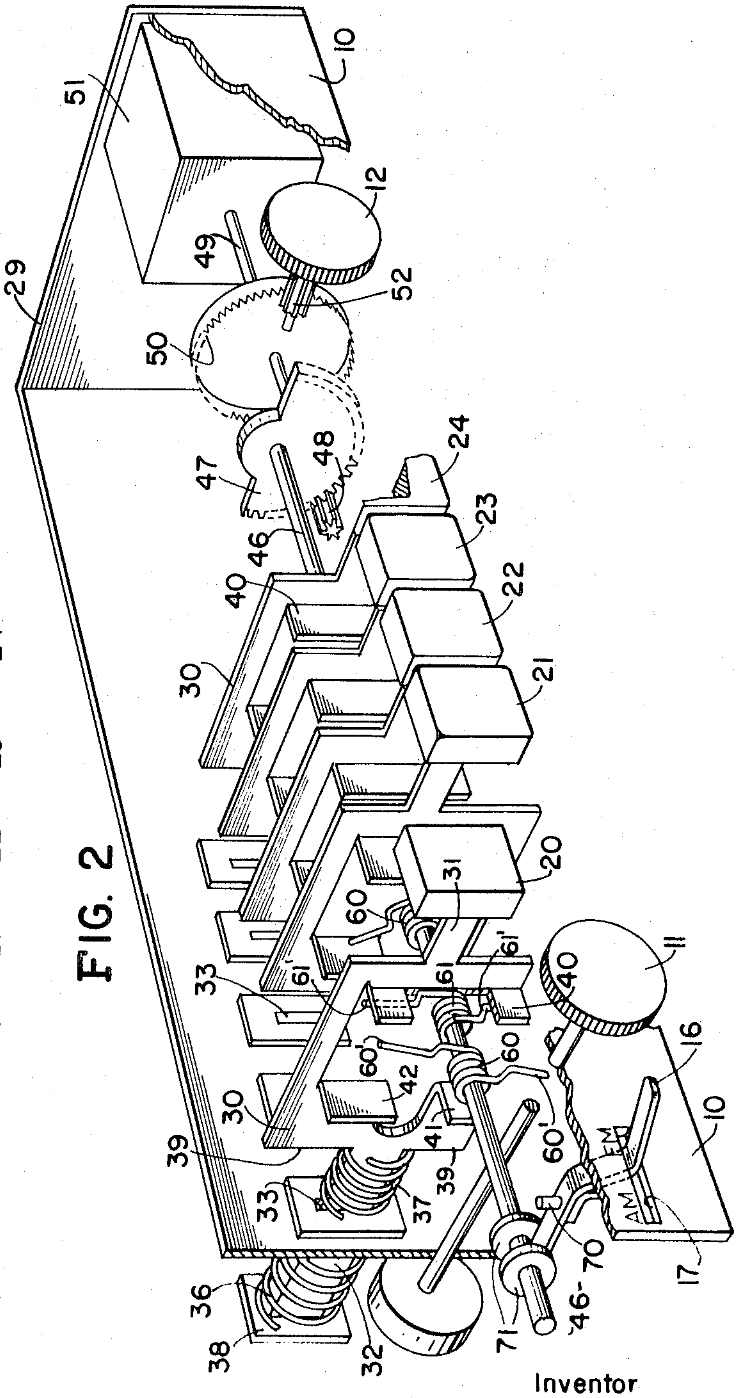
FIG. 2 is a partially cut-away perspective view of a preferred embodiment of this invention.

Referring now to FIG. 2, there is shown in detail the push-button tuning mechanism used in conjunction with the radio receiver shown in FIG. 1. The push-button tuning mechanism is mounted on a frame 29, which is shown partially broken away in FIG. 2 in order more clearly to illustrate the details of the embodiment shown. Each of the push-buttons 20 to 24 is attached to one end of an identical slide member 30 through a push-button engaging extension 31. The extensions 31 may be guided in a slot (not shown) in the face plate 10 of the receiver which in turn is connected to the frame 29. The other end of the slide members 30 terminates in an extension 32 which passes through a slot 33 formed in the rear wall of the frame 29. The slots 33 are in alignment with the corresponding slots in the face plate 10, so that the push-button slide member 30 may be reciprocated or moved back and forth between the face plate and rear wall of the frame 30.

In order to locate the push-button slide members 30 at a central position within the frame 29, a pair of coil springs 36 and 37 are provided, with the coil spring 36 being placed over the end of the extension 32 on the outside of the rear wall of the frame 29 and being retained by a spring retaining member 38 which is attached to the end of the extension 32 after the spring 36 is placed over the extension 32. Similarly, the spring 37 is confined between the rear wall of the frame 29 and a pair of shoulders 39 formed between the body of the slide member 30 and the extension 32. Thus, with the springs 36 and 37 in place as shown in FIG. 2 so that the compression forces of the springs are balanced, the slide members 30 are located at a predetermined central position within the frame 29. Each of the slide members 30 for each of the different push-buttons 20 through 24 is retained in place in a similar manner, but only the details of one of the slide members have been shown in FIG. 2 in order to avoid unnecessary cluttering of the drawing.

Figure 3:
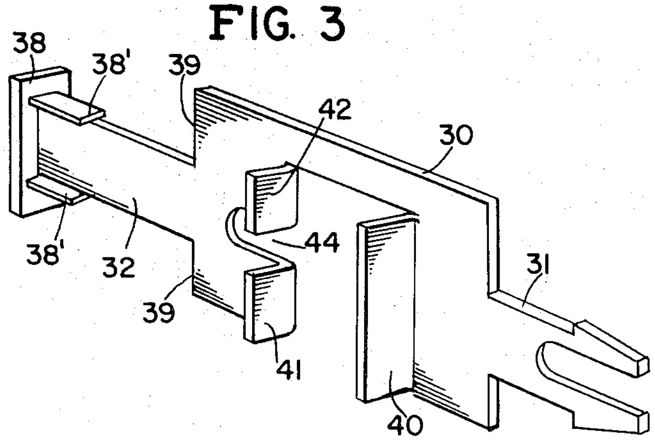
FIG. 3 is a detailed perspective view of a slide mechanism of the type used in the push-button mechanism shown in FIG. 2.

As is more clearly shown in FIG. 3, the push-button slide member 30 is generally in the form of an inverted U shape with the leg of the inverted U which is nearest the extension 31 having a shaft positioning tab 40 extending therefrom substantially at right angles to the plane of the slide member 30. The other leg of the U which is located nearest the rear wall of the frame 29 carries a pair of memory reset tabs 41 and 42 separated by a slot 44. The tabs 41 and 42 also are bent at substantially right angles to the plane of the slide member 30 and extend in the same direction as the tab 40. It is apparent that the complete slide member may be formed from a single flat sheet of stock material by bending the tabs 40, 41 and 42, or the tabs 40, 41 and 42 may be separate parts attached to the main body of the slide member 30 by any suitable means.

Passing through the openings in the inverted U of the slide members 30 is a tuner control shaft 46, which is most clearly shown in FIG. 2. The shaft 46 is supported within the housing 30 by suitable extensions on the frame 29, although such supports have not been shown in FIG. 2 in order more clearly to illustrate the disclosed embodiment. The right hand end of the tuner control shaft 46, as viewed in FIG. 2, terminates in a rack gear 47; and rotation of the shaft 46 causes rotation of the rack gear 47, which in turn drives a pinion 48. The pinion 48 is attached to a shaft 49, used to control the tuning elements of a conventional tuner 51. Since the rotary motion of the shaft 49 may be utilized in a conventional manner to effect tuning of the tuner 51, no details of this mechanism have been illusrated in FIG. 2.

For manual tuning of the receiver, the tuning knob 12 rotates a pinion 52 which drives a crown gear 50 connected to the shaft 49. The pinion 48 then rotates the rack gear 47 and the tuner shaft 46. Thus, there is a direct correlation between the rotational position of the tuner control shaft 46 and the tuner shaft 49 at all times.

Figures 4, 5:
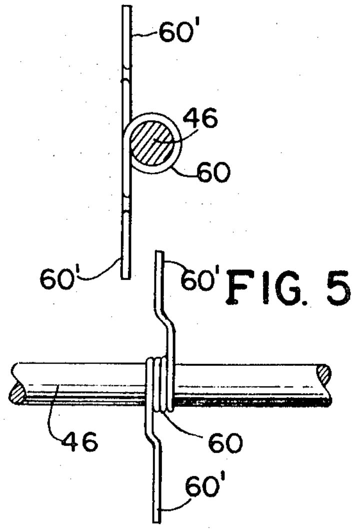
FIGS. 4 and 5 are side and front views, respectively, of a memory spring device of the type used in conjunction with the mechanism shown in FIG. 2.

In order to control the rotational position of the tuner control shaft 46 and thereby the rotational position of the tuner shaft 49, by means of the push-buttons 20 to 24, a pair of memory springs 60 and 61 are provided on the tuner control shaft 46 for each of the push-buttons 20 to 24. Thus, there are a total of five memory control springs 60 and five memory control springs 61, with each of the springs being wound about the tuner control shaft 46 for rotation therewith, and with the ends terminating on the same side of the shaft in a pair of extensions 60' or 61' for the springs 60 and 61, respectively. The construction of the springs 60 and 61 is shown most clearly in FIGS. 4 and 5 where it may be seen that extensions 60' (or 61') are vertically aligned with one another and lie in the same plane parallel to the axis of the tuner control shaft 46. The springs 60 and 61 are formed of round or flat spring wire and grip the shaft 46 so that the springs 60 and 61 normally rotate with the rotation of the shaft 46. Thus, rotation of the shaft 46 under control of the manual tuning knob 12 causes corresponding rotation of each of the sets of springs 60 and 61 associated with each of the push-buttons 20 to 24.

The band selection switch 16 operates as a lever pivoted on a pivot 70 secured to the face plate 10 through which the switch 16 projects.

With the band selection switch 16 located in rightmost position of the slot 17 as shown in FIGS. 1 and 2, the other end of the switch lever 16 moves to the left. This end of the lever 16 is located between a pair of discs 71 affixed to the shaft 46; so that the shaft 46 is moved axially to the left by a distance controlled by the movement of the band selection switch lever 16. In this position, the memory springs 61 associated with each of the push-buttons 20 through 24 are aligned with the path of travel of the shaft positioning tab 40 and the memory reset tabs 41 and 42 on each of the slide members 30 for each of the push-buttons. The springs 60 then are located to the left of the tabs 40, 41 and 42 in an amount sufficient to be cleared by the tabs in the event that the associated push-buttons are either depressed or pulled out.

Conversely, when the band selection switch 16 is moved to its leftmost or AM position, the lever pivots about the pivot 70 to move the tuner control shaft 46 to the right to align the springs 60 with the tabs 40, 41 and 42, and the springs 61 for each of the push-buttons 20 to 24 are moved out of the path of movement of the push-button slide members 30 and the associated tabs 40, 41 and 42. Thus, it may be seen that the five springs 60, one for each of the push-buttons 20 to 24, are associated with the AM position of the band selection switch and the five springs 61 for each of the push-buttons are associated with the FM position of the band selection switch.

Assume that the band selection switch 16 is in the position shown in FIG. 2 and that it is desired to tune the radio receiver to a position established by the memory spring 61 associated with the push-button 20. In FIG. 2 the push-button 20 is shown in its depressed position with the other push-buttons being shown in their normal position. When the push-button 20 is fully depressed, the shaft positioning tab 40 for the push-button 20 engages both extensions 61' of the spring 61 to vertically align the spring 61 with the shaft positioning tab 40. Since the spring 61 firmly grips the shaft 46, the shaft 46 is rotated to the position corresponding to the vertical position of the spring 61 associated with the push-button 20, thereby tuning the radio tuner 51 to the station corresponding to that rotational position of the control shaft 46. Subsequent release of the push-button 20 causes it to return to a position in alignment with the push-buttons 21 through 24, where the springs 60 and 61 are free to rotate within the opening of the inverted U's formed in each of the spring slide members 30.

Figure 6:
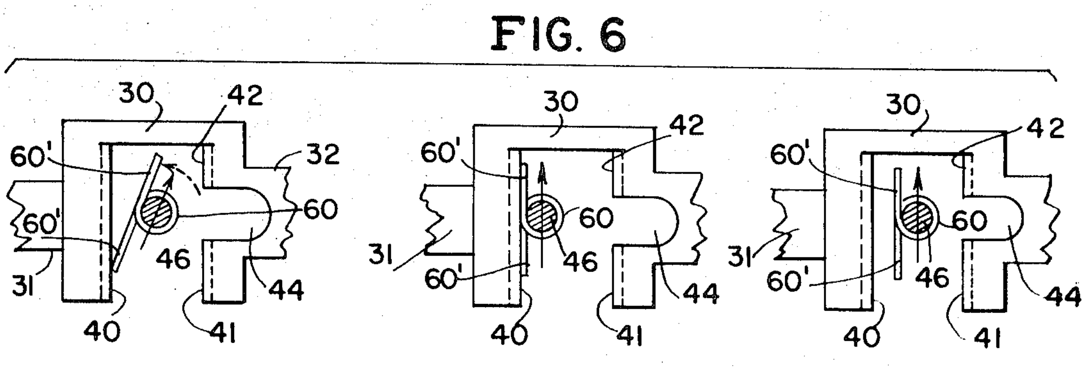
FIGS. 6 and 7 illustrate the operation of the mechanism shown in FIG. 2.

The manner in which a memory spring 60 or 61 may be utilized to rotate the tuner control shaft 46 in order to tune the tuner 51 to a station corresponding to a depressed push-button is more clearly shown in FIG. 6. FIG. 6 shows a three-step operation of a push-button slide mechanism 30 for setting the tuner to a position corresponding to the setting of a memory spring 60. In the left hand segment of FIG. 6, the push-button slide mechanism 30 is being moved to the right to a position where the shaft position tab 40 just engages the end of one extension 60' on the spring 60 associated with that push-button slide mechanism. The force applied to the extension 60' by the shaft positioning tab 40 is in a direction to cause the spring 60 to be wrapped more tightly about the shaft 46. Thus, the spring 60 and the shaft 46 are rotated in the direction of the dotted arrow so long as the shaft positioning tab 40 continues to move to the right as viewed in FIG. 6. Movement to the right of the tab 40 and the slide member 30 is terminated when the shaft positioning tab 40 firmly engages both extensions 60' of the spring 60 and abuts against the spring and shaft 46 as shown in the center segment of FIG. 6. The solid arrow shown across the shaft 46 in parallel with the spring extensions 60' indicates that the shaft 46 has rotated to the new position shown in the center segment of FIG. 6 under the control of the rotation of the spring 60. Release of the push-button then permits the spring 37 (FIG. 2) to force the slide member 30 to the position shown in the third segment of FIG. 6, with the shaft 46 now aligned in a new position as determined by the relative orientation of the spring 60 and the shaft 46. Thus, the spring members constitute memory elements for permitting tuning of the radio tuner to different stations, each associated with a different one of the push-buttons 20 to 24.

In the event that a station which is tuned manually is desired to be reset into the memory for a particular push-button, the springs 60 and 61 can be reoriented on the tuner control shaft 46 to correspond to this new desired station. This is accomplished in the manner illustrated in FIG. 7 by pulling out the associated push-button 20 which causes the slide member 30 to be moved to the left as viewed in the left hand segment of FIG. 7 against the urging of the spring 36 shown in FIG. 2. When the slide member 30 is moved to the left, one or the other of the memory reset tabs 41 or 42 engages one of the extensions 60' of the spring from the opposite side as shown in FIG. 6. In the example shown in FIG. 7, the memory reset tab 42 engages the upper extension of the spring 60 in a direction to effect an unwinding of the spring from the shaft 46.

There is sufficient friction in the linkage between the shaft 46 and the tuner 51 to permit the spring 60 to be released from engagement with the shaft 46 and to rotate in the direction of the dotted arrow under continued leftward movement of the slide member 30. As shown in the center segment of FIG. 7, when the slide member 30 is pulled out to its outermost position, as determined by the point at which the stop members 38' (FIG. 3) engage the rear wall of the frame 29, both of the tabs 41 and 42 engage the extensions 60' of the spring member 60, continuing to cause the spring to be released from intimate engagement with the shaft 46 by a slight unwinding of the spring. The degree of unwinding has been exaggerated in the center segment of FIG. 7 in order to illustrate the manner of this resetting.

Figure 7:
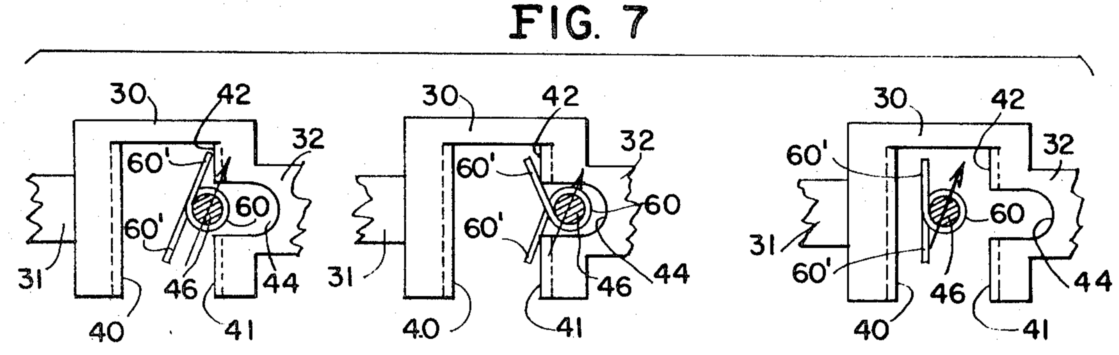

Since the memory reset tabs 41 and 42 are located in a plane which is parallel to the plane of the shaft positioning tab 40, release of the push-button, permitting the springs 36 and 37 to return the slide mechanism to the position shown in the right hand segment of FIG. 7, causes the spring extensions 60' to be aligned vertically with the push-button shaft positioning tab 40. During this resetting sequence, however, the shaft remains in the same position to which it was set prior to the resetting of the memory spring 60 so that the relative position of the spring 60 and the shaft 46 has been changed. It is apparent that if the push-button mechanism subsequently is moved to the right to cause the shaft positioning tab 40 to engage one of the extensions 60' of the memory spring, the spring and shaft will be rotated together as shown in FIG. 6 to rotate the shaft 46 to the position shown in the right-hand segment of FIG. 7.

Similar operation of the push-button mechanism for the springs 61 for each of the push-buttons takes place when the AM/FM lever 16 is in the FM position.

From the foregoing, it may be seen that the shaft 46 may be positioned to any desiretd rotational position corresponding to a particular station by means of the manual tuning knob 12. After the shaft has been thus positioned, a memory spring 60 or 61 associated with any one of the five push-buttons 20 to 24 may be reset to a vertical position in accordance with the operation shown in FIG. 7. Subsequent depression of that same push-button then always rotates the spring and the shaft 46 to the position corresponding to the desired station. The particular one of the springs 60 or 61 which is set by a push-button depends upon the position of the AM/FM switch 16 since only one of the springs 60 or 61 is aligned with the tabs 40, 41 and 42 associated with each of the push-buttons. The particular set of springs aligned with the push-buttons is dependent upon the axial position of the shaft 46 as determined by the position of the switch 16.

It should be noted that the rotational movement of the shaft 46 must be limited to an amount insufficient to reverse the relative positions of the upper and lower extensions 60', 61' of the springs 60, 61, since to do so would cause a reversal in the push-button operation described above. Such limitation conveniently may be provided by flat portions of the outer periphery of the teeth of the rack gear 47.

I claim:

1. A rotary shaft positioning mechanism including in combination:

a rotary shaft to be positioned;

resettable position memory means normally gripping the shaft for rotation therewith and having an engageable extension thereon;

first engaging means for engaging and moving the extension in a first direction, causing the memory means to grip the shaft and to rotate the shaft therewith in an amount determined by the distance the extension is moved; and second engaging means for engaging and moving the extension in a second direction, causing the memory means to be released from the shaft and to rotate independently of the shaft in an amount determined by the distance the extension is moved in the second direction, the first and second engaging means normally being disengaged from the extension to permit rotation of the memory means with the rotation of the shaft.

2. The combination according to claim 1 wherein the first and second engaging means are arranged to move linearly on opposite sides of the extension in said first and second directions, with the extension extending into the path of movement of the first and second engaging means.

3. The combination according to claim 1 having a plurality of resettable position memory means, each having an engageable extension thereon, wherein the first and second engaging means are arranged to selectively engage the extensions on each of the plurality of memory means.

4. The combination according to claim 1 wherein the memory means is a spring means wound about the shaft and wherein the extension is attached to an end of the spring means, so that engaging the extension and moving it in the first direction causes the spring means to more tightly grip the shaft and wherein engaging the extension and moving it in the second direction causes the spring means to be unwound from the shaft, thereby releasing it therefrom to rotate independently of the shaft.

5. The combination according to claim 4 wherein the shaft to be positioned is part of the tuning mechanism of a pushbutton radio further including a pushbutton slide, and wherein the first and second engaging means are located on and carried by the pushbutton slide.

6. The combination according to claim 4 wherein the spring means includes at least one full turn around the shaft and has said extensions at each end extending substantially tangentially of the circumference of the shaft.

7. The combination according to claim 6 wherein the extensions extend substantially in opposite directions and the first and second engaging means are adapted to engage either of the extensions.

8. The combination according to claim 7 wherein the first and second engaging means are mounted on the slide of a pushbutton mechanism adapted for movement in said first and second directions, and wherein movement of the slide to a predetermined position in the first direction causes the first engaging means to rotate the spring and the shaft to a predetermined rotary position and wherein movement of the slide to a second predetermined position in the second direction causes the second engaging means to rotate the spring means to said predetermined rotary position independently of the position of the shaft.

9. The combination according to claim 8 wherein a plurality of spring means and a plurality of sets of first and second engaging means are provided, each spring means being aligned with one set of the plurality of first and second engaging means, each set of which is correspondingly mounted on a different slide of a pushbutton mechanism.

10. A multiple station pushbutton selection mechanism for a wave signal receiver having a resettable pushbutton memory including in combination:

- a shaft rotatable to different positions indicative of different stations to be selected by the mechanism;
- a plurality of resettable position memory means, each gripping the shaft for rotation therewith and each having at least one engageable member protruding therefrom in a direction which is tangential to the circumference of the shaft;
- first engaging means for engaging and moving the members in a first direction, movement of a member in the first direction causing the memory means to more firmly grip the shaft and to rotate the memory means and the shaft together; and
- second engaging means for engaging and moving the members in a second direction, movement of a member in the second direction causing the memory means to be released from the shaft and to rotate independently of the shaft, the first and second engaging means normally being disengaged from the members to permit the memory means to rotate with rotation of the shaft.

11. The combination according to claim 10 further including a plurality of pushbutton slide mechanisms, wherein the first and second engaging means are arranged in sets, each set including different first and second engaging means mounted on a different pushbutton slide mechanism in alignment with predetermined ones of the engageable members of the memory means.

12. The combination according to claim 11 wherein the memory means each constitutes a spring wound about the shaft, the ends of the springs extending in substantially opposite directions on the same side of the shaft to form a pair of engageable members for each spring, wherein movement of either or both of the spring ends in the first direction causes a spring to be wrapped more tightly about the shaft and wherein movement of either or both of the spring ends in the second direction causes the spring to be released from the shaft for independent movement.

13. The combination according to claim 12 wherein at least two springs are provided on the shaft for each pushbutton slide mechanism, with the shaft being axially moveable to align a predetermined one of the two springs with the first and second engaging means mounted on each slide mechanism.

14. The combination according to claim 12 wherein movement of a slide mechanism to a predetermined position in the first direction causes the first engaging means mounted on that slide mechanism to rotate the spring and the shaft to a predetermined rotary position and wherein movement of a slide mechanism to a second predetermined position in the second direction causes the second engaging means mounted on that slide mechanism to rotate only the spring to said predetermined rotary position.

15. A mechanical positioning memory mechanism, including in combination:

- a housing;
- a rotatable shaft mounted in said housing, said shaft being rotatably positioned in accordance with a preset memory condition;
- resettable position memory means gripping said shaft for rotating the same to a desired position;
- means for releasing said rotatable position memory means for gripping said shaft and rotating said rotatable position memory means to a new position on the shaft; and
- actuation means extending from said housing means to be manipulated in a direction so as to engage said resettable position memory means and rotate the said shaft when the said resettable position memory means is gripping the said shaft.

16. The combination according to claim 15 wherein said means for releasing a said rotatable position memory means is connected to said actuation means and engageable with said resettable position memory means when said actuation means is moved in a direction opposite the direction for rotating the shaft.

References Cited

UNITED STATES PATENTS

| | | | |
|---|---|---|---|
| 2,205,968 | 6/1940 | Almen | 74—10.37 |
| 2,260,429 | 10/1941 | Barrett | 74—10.37 |
| 2,272,922 | 2/1942 | Plensler | 74—10.37 |

MILTON KAUFMAN, Primary Examiner

U.S. Cl. X.R.

334—7